United States Patent [19]
Smith

[11] Patent Number: 5,295,506
[45] Date of Patent: Mar. 22, 1994

[54] FLOW CONTROL APPARATUS

[76] Inventor: Allan L. Smith, 30747 Rd. 212, Exeter, Calif. 93221

[21] Appl. No.: 990,073

[22] Filed: Dec. 14, 1992

[51] Int. Cl.⁵ ............................................. F16K 15/14
[52] U.S. Cl. ................................... 137/271; 137/496; 137/504; 137/513.5; 137/515.5; 138/46; 285/73; 285/913
[58] Field of Search ............... 137/271, 496, 497, 504, 137/513.5, 515, 515.3, 515.5, 515.7, 614, 614.04; 138/46; 285/66, 73, 74, 913

[56] References Cited

U.S. PATENT DOCUMENTS

| | | | |
|---|---|---|---|
| 402,300 | 4/1889 | Campbell | 137/614.04 |
| 541,714 | 6/1895 | Bottomly | 137/614.04 X |
| 822,423 | 6/1906 | Bates | 285/66 |
| 996,588 | 6/1911 | Kennedy | 137/515.7 |
| 1,738,996 | 12/1929 | Hamilton | 285/73 X |
| 1,779,421 | 10/1930 | Cox | 137/515.3 |
| 2,497,906 | 2/1950 | Peters et al. | 137/496 |
| 2,729,237 | 1/1956 | Hite | 137/515.7 |
| 2,813,541 | 11/1957 | Beller | 137/504 |
| 2,838,538 | 5/1960 | Allen | 137/504 |
| 3,693,888 | 9/1972 | Rondas et al. | |
| 3,807,430 | 4/1974 | Keller | 137/504 |
| 4,165,764 | 8/1979 | Grandclement | 137/504 X |
| 4,182,356 | 1/1980 | Woodford | 138/46 X |
| 4,196,753 | 4/1980 | Hammarstedt | 137/504 X |
| 5,046,526 | 9/1991 | Longmore | 137/515.5 |

Primary Examiner—Robert G. Nilson
Attorney, Agent, or Firm—Worrel & Worrel

[57] ABSTRACT

A flow control apparatus having a pair of substantially identical housings, each having a path for fluid passage therethrough bounded by an annulus; a resilient body; and substantially identical portions borne by the housings releasably engageable to interlock the housings in an assembled configuration with the resilient body captured in the housings between the annuli of the paths for fluid passage.

8 Claims, 4 Drawing Sheets

FLOW CONTROL APPARATUS

BACKGROUND OF THE INVENTION

1. Field of the Invention

The present invention relates to a flow control apparatus and, more particularly, to such a flow control apparatus which is particularly well suited to individual configuration to perform predetermined operational objectives.

2. Description of the Prior Art

The science associated with the control of fluids incorporates a host of disciplines having application to a multitude of uses. While the particular characteristics of a given fluid influence the mechanics to be applied in achieving a predetermined objective, all fluids possess certain characteristics which must be taken into account in achieving operational objectives. For example, while the particular viscosity of a given fluid must be considered, the universal responses of fluids, regardless of viscosity, to given external influences are of more significant concern. Thus, the responses of fluids to pressure increases and decreases, velocity variations, pressure differentials, volumetric variations and friction are of paramount importance in the practical application of these disciplines.

Loosely identified by the appellation "fluid mechanics," these disciplines have a particularly useful application in the control and use of water in irrigation. While considerable technological advances have been made over many decades in the control of water used in irrigation, the need to conserve water, and otherwise to control its use, has significantly increased the practical demands upon fluid mechanics to find solutions. A premium has been placed upon the economical usage of available water resources resulting in the development of entirely new industries devoted to low volume and drip irrigation. In all types of irrigation there is a need to control the direction of fluid flow, to prevent a reversal of fluid flow, to control the volume of fluid flow, to prevent, or at least minimize, occlusion of fluid orifices by deleterious materials and otherwise to ensure that the desired quantity of water is delivered to the target from the source. These objectives criteria are typically more difficult to achieve in low volume and drip irrigation.

As contrasted with flood irrigation, for example, in low volume and drip irrigation water is delivered through a complex fluid system consisting of a multiplicity of conduits, couplings, and sprinklers or emitters. There are, thus, a significantly greater number of components comprising the fluid system which causes the cost of the fluid system, both in initial purchase price as well as in installation, to be considerably greater than would be the case with other types of irrigation systems. Accordingly, a premium is placed upon such components which can perform their operational objectives, but which are of low cost. Similarly, a premium is placed upon such components which can readily be serviced or repaired and which are sufficiently flexible in practical application to permit them to be adjusted to different operational objectives. For example, after installation, it may be determined that the optimum volume of water required for a particular target area is more or less than initially determined.

For these reasons and others, it has been recognized that it would be desirable to have a component which could be adjusted to increase or decrease the volume of water applied therethrough without having to replace the component to achieve this result. Similarly, it would be desirable to have such a component which could readily be disassembled without tools to free deleterious materials which may have become entrapped therein occluding fluid orifices. It would be desirable to have such a component which could readily be employed, if desired, completely to prevent the flow of water therethrough. Still further, it would be desirable to have such a component which could be manufactured and sold at minimum cost and yet which possessed a long operational life. Finally, it would be desirable to have such a component which was of virtually universal application in that it could be constructed in a variety of sizes and specific characteristics to control the flow of fluids of all types in virtually all areas of practical application. While prior art efforts have been directed to these objectives, they have never successfully been achieved, particularly in a single device.

Therefore, it has long been known that it would be desirable to have a flow control apparatus operable to control the flow of fluids of all types which could be employed to control the volume of fluid flow adjusting to fluctuations in fluid pressure; which had particular application to low volume and drip irrigation systems; which could readily and inexpensively be reconfigured to adjust the operational objectives achieved thereby; which could, if desired, be so adjusted as completely to obstruct the flow of fluid therethrough; which could readily be disassembled for the removal of deleterious materials therefrom without the use of tools; and which could be manufactured and sold at minimal cost.

SUMMARY OF THE INVENTION

Therefore, it is an object of the present invention to provide an improved flow control apparatus.

Another object is to provide such a flow control apparatus which has application to the control of fluids of virtually all types through fluid systems of virtually all types.

Another object is to provide such a flow control apparatus which is uniquely well suited to usage in low volume and drip irrigation systems to control the flow of water therethrough.

Another object is to provide such a flow control apparatus which is operable to respond to extreme fluctuations in fluid pressure by delivering a substantially constant volume of fluid flow therethrough notwithstanding such fluctuations in fluid pressure.

Another object is to provide such a flow control apparatus which can be so configured as to operate substantially as a back flow preventer allowing fluid movement in a predetermined, normal direction of travel therethrough while preventing fluid flow in a reversed direction therethrough.

Another object is to provide such a flow control apparatus which can rapidly be adjusted if desired so as completely to terminate the flow of fluid therethrough.

Another object is to provide such a flow control apparatus which is composed of substantially, universally interchangeable parts which can be employed rapidly and dependably by essentially untrained personnel to achieve predetermined operational objectives, both at the time of initial sale, as well as during usage throughout a long operational life.

Another object is to provide such a flow control apparatus which can be reconfigured, in accordance with the changing requirements of the operation to be performed, rapidly and dependably without the use of tools.

Another object is to provide such a flow control apparatus which can rapidly be manipulated to and from an assembled operational configuration achieving a fluid tight condition in the operational configuration using a minimum of operable parts and with little or no risk of improper assembly.

Further objects and advantages are to provide improved elements and arrangements thereof in an apparatus for the purpose described which is dependable, economical, durable and fully effective in accomplishing its intended purpose.

These and other objects and advantages are achieved, in the preferred embodiment of the present invention, in a flow control apparatus having a pair of substantially identical housings, each having a path for fluid passage therethrough bounded by an annulus; a resilient body; and substantially identical portions borne by the housings releasably engageable to interlock the housings in an assembled configuration with the resilient body captured in the housings between the annuli of the paths for fluid passage.

DESCRIPTION OF THE PREFERRED EMBODIMENT

Figure 1:
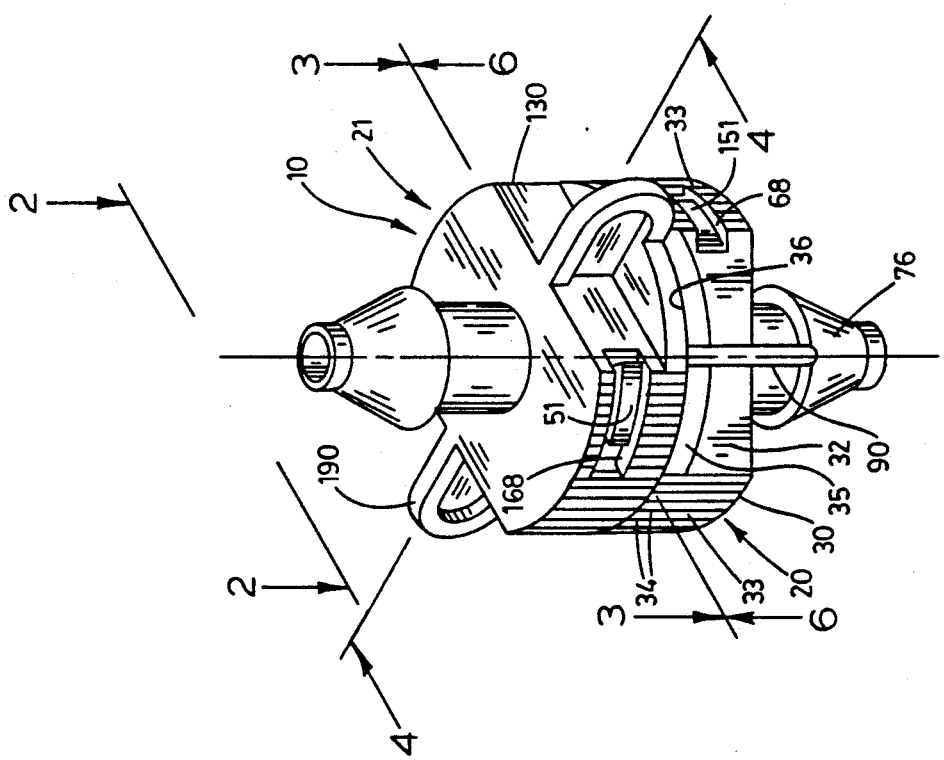
FIG. 1 is a perspective view of the flow control apparatus of the present invention.

Referring more particularly to the drawings, the flow control apparatus of the present invention is generally indicated by the numeral 10 in FIG. 1. While the apparatus can be constructed in a wide variety of specific embodiments, the preferred embodiment possesses a number of significant operational advantages, as will hereinafter be set forth in greater detail.

In the preferred embodiment, the apparatus is constructed of a pair of substantially identical molded plastic housings; that is, a lower or first housing 20 and a upper, or second housing, 21. While structurally the first and second housings are identical, in the preferred embodiment the first and second housings are of different colors. Preferably, the different colors are achieved by distinctively different coloration of the plastic used in the molding process so that, for example, the first housing is of a light blue coloration and the second housing is of a light green coloration.

The flow control apparatus can be constructed in a wide variety of different sizes depending upon the requirements of the specific job to be performed. In the illustrative embodiment, the apparatus is of a type to be employed in drip or low volume irrigation. Thus, in the illustrative embodiment the transverse dimension of the apparatus is about one quarter (¼) of an inch.

Figure 2:
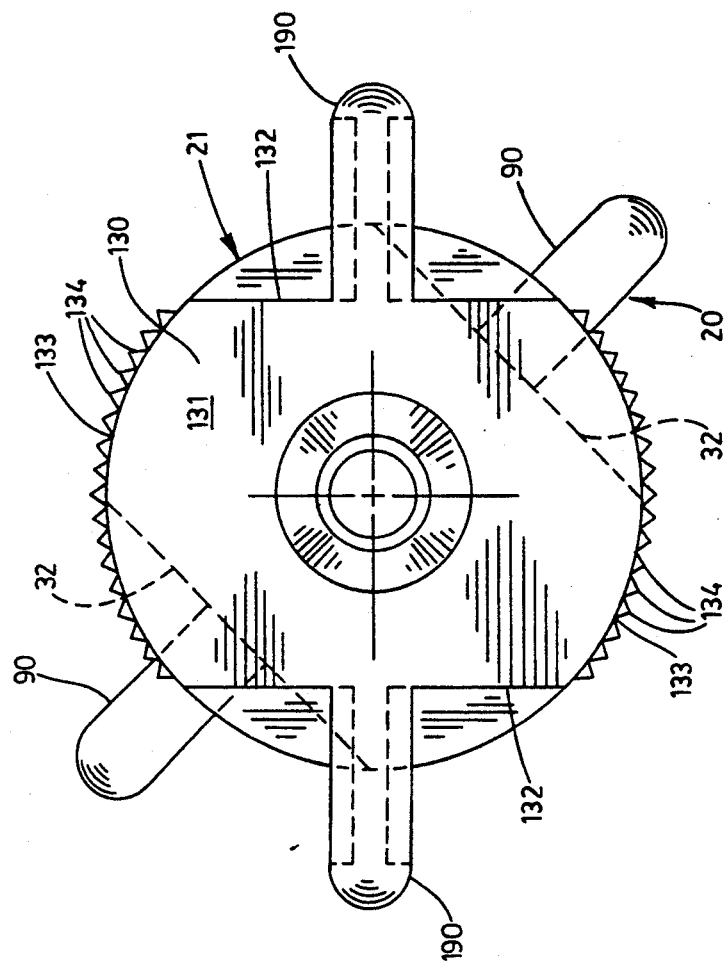
FIG. 2 is a somewhat enlarged top plan view taken on line 2—2 in FIG. 1.

For illustrative convenience, the first and second housings, 20 and 21, respectively, are separately described using separate reference numerals. The first housing 20 has a main body 30 with a lower surface 31 and flat side surfaces 32. As shown in FIG. 2 in hidden lines, the flat side surfaces are parallel to each other. The main body has arcuate end surfaces 33 having substantially parallel ridges 34 covering the surfaces thereof and disposed in right angular relation to the lower surface 31 of the main body. The portion of the housing opposite the lower surface 31 can be viewed as being a circular flange 35 with an upper or mating surface 36 which is parallel to the lower surface 31. The circular flange has a circular periphery 37.

The main body 30 can be viewed as having a main body wall 40 having an interior surface 41 of stepped cylindrical portions. Thus, the interior surface 41 has an outer cylindrical portion 42 which intersects with the upper surface 36 of the circular flange 35. The interior surface has a sloped shoulder portion 43 of a truncated conical configuration which joins an inner cylindrical surface 44, as can perhaps best be seen in FIG. 4. The main body 30 has a floor surface 45 which is parallel to the lower surface 31 of the main body and the upper surface 36 of the circular flange.

Figure 4:
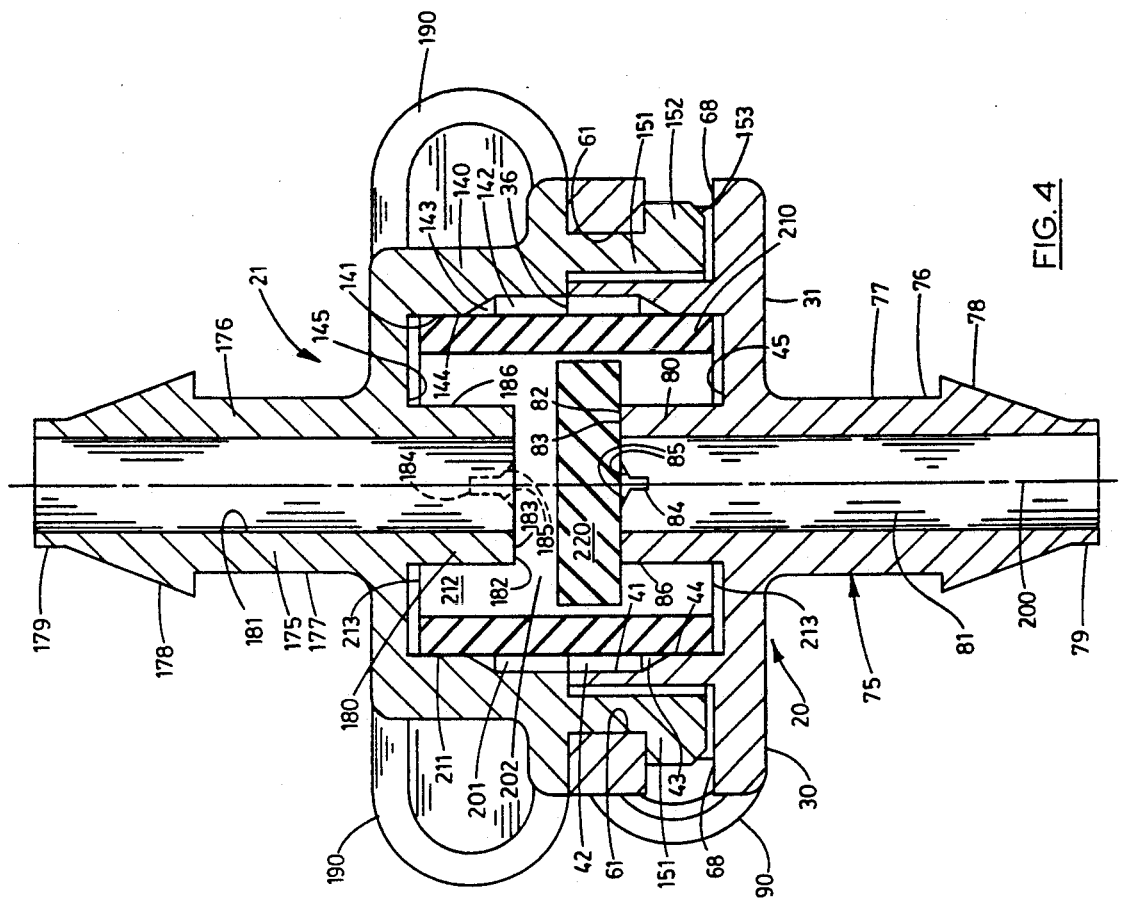
FIG. 4 is a somewhat further enlarged, longitudinal, vertical section taken on line 4—4 in FIG. 1.
Figure 3:
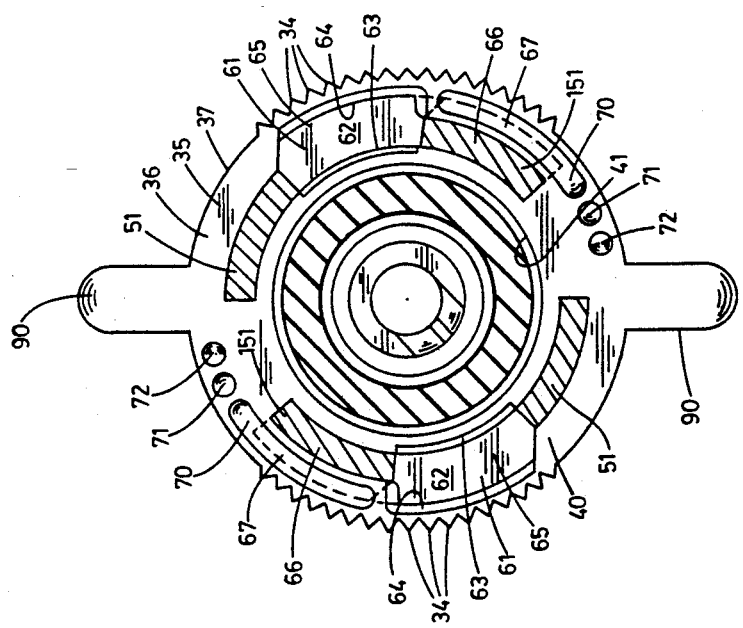
FIG. 3 is a transverse, horizontal section taken on line 3—3 in FIG. 1.
Figure 5:
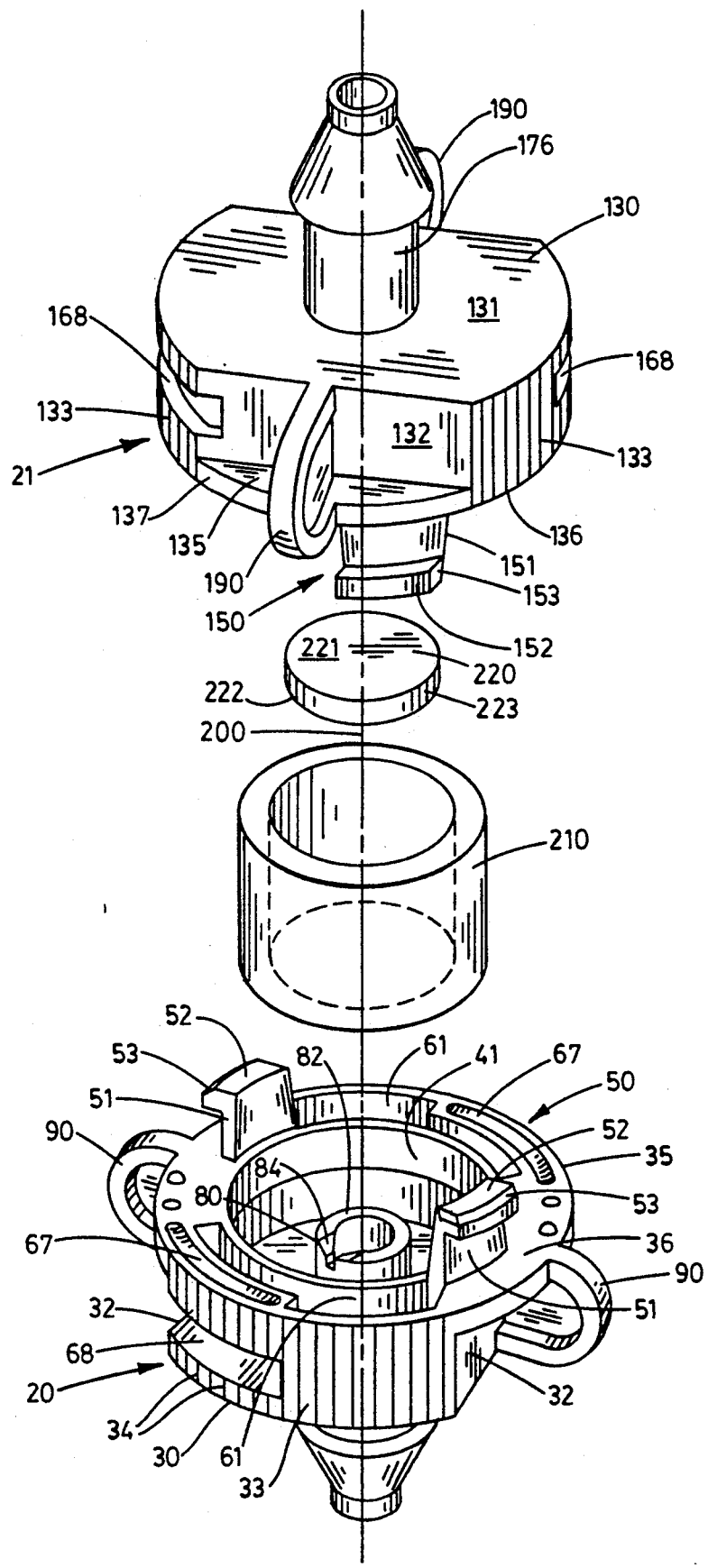
FIG. 5 is an exploded perspective view of the flow control apparatus.

The first housing 20 has a hermaphroditic interlocking assembly 50, which can best be seen in FIGS. 3, 4 and 5. The interlocking assembly includes a pair of arcuate projections 51 mounted on and extending upwardly from the upper surface 36 of the circular flange 35 on opposite sides of the main body wall 40. Each of the projections has an arcuate lateral flange 52 extending away from the interior surface 41 of the main body wall. Each of the arcuate lateral flanges has a bevelled edge 53, as shown in FIG. 5. The interlocking assembly further includes a pair of arcuate receptacles 61 extending in clockwise direction from each of the projections, as best shown in FIG. 5. Each of the receptacles has a bottom surface 62, a right-angularly related interior surface 63 and an outer surface 64 also right-angularly related to the bottom surface. Each receptacle can be viewed as having an entry portion 65 most closely adjacent to its respective projection and an interlocking portion 66 farthest from its respective projection. The interlocking portion 66 of each receptacle is partially overhung by a flange 67. A slot 68 extends through the end surface 33 adjacent to each receptacle and interconnecting the receptacle with the exterior of the main body 30, as can best be seen in FIG. 1.

An arcuate channel 70 is provided in each of the flanges 67, as shown in FIG. 3. A concave recess 71 and convex protrusion 72 are formed on the mating surface 36 in alignment with the end of each channel.

The main body 30 can be viewed as having a fluid conduit 75 best shown in FIG. 4. The fluid conduit includes an outer connection portion 76 extending from the lower surface 31 of the main body. The outer connection portion has a cylindrical outer surface 77 circumscribed by a bevelled shoulder 78 and extending to a distal end portion 79. The bevelled shoulder is employed for connection to a plastic conduit. This can be achieved, as is conventionally the case, by stretching the end of the conduit about the bevelled shoulder or by puncturing the side of a conduit with the outer connection portion 76. In both cases the bevelled shoulder maintains engagement with the conduit which is stretched thereabout. Alternatively, a screw thread can be employed in place of the bevelled shoulder 78 for the same purpose. The fluid conduit has an interior portion 80 right-angularly related to the floor surface 45 and concentric to the interior surface 41 of the main body wall 40. A fluid passage 81 extends entirely through the fluid conduit from the distal end portion 79 of the outer connection portion through the interior end of the interior portion 80 concentric to the fluid conduit. The fluid passage extends outwardly of the interior end portion of the fluid conduit through a circular annulus 82. The annulus has a surface 83 defining a plane which is right-angularly related to the fluid passage and to the interior surface 41 of the main body wall 40. A slotted flow control passage 84 is formed in the surface 83 of the annulus 82, as best shown in FIGS. 4 and 5. The flow control passage is bounded by bevelled shoulders 85. The interior portion 80 of the fluid conduit has a cylindrical outer surface 86.

Mounted on and extending outwardly from each of the flat side surfaces 32 is a twist lock tab 90. The lock tabs are molded in the fabrication of the first housing 20 from the same material and are, thus, rigid with the main body 30 for purposes of grasping, as will hereinafter be described in greater detail.

As previously noted in the preferred embodiment, the upper or second housing 21 is identical, except for coloration, to the lower or first housing 20. The second housing will, however, be described independently of the first housing. The reference numerals for the second housing are identical to those of the first housing with the exception that they are numerals in the 100 series. Thus, the second housing 21 has a main body 130 having a end surface 131 and flat side surfaces 132. As shown in FIG. 2 in hidden lines, the flat side surfaces are parallel to each other. The main body has arcuate end surfaces 133 having substantially parallel ridges 134 covering the surface thereof and disposed in right angular relation to the end surface 131 of the main body. The portion of the housing opposite the end surface 131 can be viewed as being a circular flange 135 with a lower or mating surface 136 which is parallel to the end surface 131. The circular flange has a circular periphery 137.

The main body 130 can be viewed as having a main body wall 140 having an interior surface 141 of stepped cylindrical portions. Thus, the interior surface 141 has an outer cylindrical portion 142 which intersects with the mating surface 136 of the circular flange 135. The interior surface has a sloped shoulder portion 143 of a truncated conical configuration which joins an inner cylindrical surface 144, as can perhaps best be seen in FIG. 4. The main body 130 has a floor surface 145 which is parallel to the end surface 131 of the main body and the mating surface 136 of the circular flange.

The second housing 21 has a hermaphroditic interlocking assembly 150 which can best be seen in FIGS. 3, 4 and 5. The interlocking assembly includes a pair of arcuate projections 151 mounted on and extending upwardly from the mating surface 136 of the circular flange 135 on opposite sides of the main body wall 140. Each of the projections has an arcuate lateral flange 152 extending away from the interior surface 141 of the main body wall. Each of the arcuate lateral flanges has a bevelled edge 153 as shown in FIG. 5. The interlocking assembly further includes a pair of arcuate receptacles 161 extending in clockwise direction from each of the projections, as best shown in FIG. 5. Each of the receptacles includes a bottom surface 162, a substantially right-angularly related interior surface 163 and an outer surface 164. Each receptacle can be viewed as having an entry portion 165 most closely adjacent to its respective projection and an interlocking portion 166 farthest from its respective projection. The interlocking portion 166 of each receptacle is partially overhung by an interlocking flange 167. A slot 168 extends through the end surface 133 adjacent to each receptacle and interconnecting the receptacle with the exterior of the main body 130, as can best be seen in FIG. 1.

Figure 6:
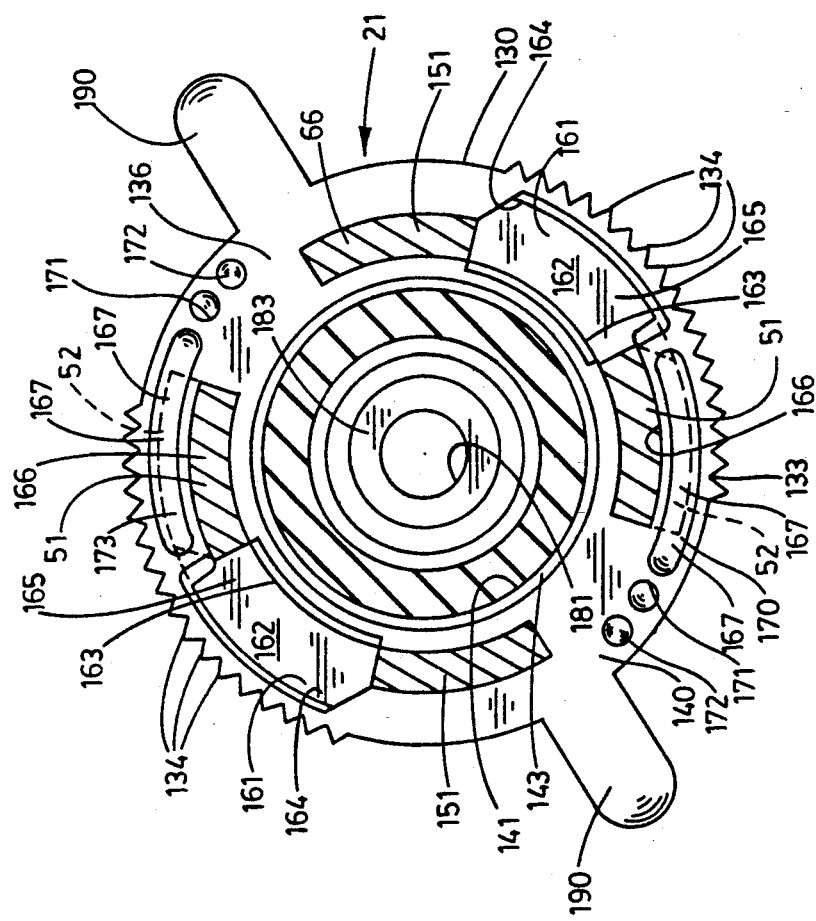
FIG. 6 is a transverse, horizontal section taken on line 6—6 in FIG. 1.

An arcuate channel 170 is provided in each of the flanges 167, as shown in FIG. 6. A concave recess 171 and a convex protrusion 172 are formed on the mating surface 136 in alignment with the end of each channel.

The main body 130 can be viewed as having a fluid conduit 175, best shown in FIG. 4. The fluid conduit includes an outer connection portion 176 extending from the end surface 131 of the main body. The outer connection portion has a cylindrical outer surface 177 circumscribed by a bevelled shoulder 178 and extending to a distal end portion 179. As with the first housing 20, if desired, a screw thread can be used in place of the bevelled shoulder for the same purpose. The fluid conduit has an interior portion 180 right-angularly related to the floor surface 145 and concentric to the interior surface 141 of the main body wall 140. A fluid passage 181 extends entirely through the fluid conduit from the distal end portion 179 of the outer connection portion through the interior end of the interior portion 180 concentric to the fluid conduit. The fluid passage extends outwardly of the interior end portion of the fluid conduit through a circular annulus 182. The annulus has a surface 183 defining a plane which is right-angularly related to the fluid passage and to the interior surface 141 of the main body wall 140. A slotted flow control passage 184 is formed in the surface 183 of the annulus 182, as best shown in phantom lines in FIG. 4. The flow control passage is bounded by bevelled shoulders 185. The interior portion 180 of the fluid conduit has a cylindrical outer surface 186.

Mounted on and extending outwardly from each of the flat side surfaces 132 is a twist lock tab 190. The lock tabs are molded in the fabrication of the second housing 21 from the same material and are, thus, rigid with the main body 130 for purposes of grasping, as will hereinafter be described in greater detail.

The flow control apparatus 10 is shown in FIGS. 1 and 4 in an assembled configuration. When so assembled, the first and second housings 20 and 21, respectively, are concentric to a longitudinal axis 200, shown in FIGS. 1, 4 and 5. When in the assembled configuration, the mating surface 36 of the first housing and the mating surface 136 of the second housing, are disposed in facing engagement, as will hereinafter be described. When so assembled, the first and second housings, or the main bodies 30 and 130 thereof, form a unit. The interior surface 41 of the first housing and the interior surface 141 of the second housing are disposed in alignment to define a fluid chamber 201 for the flow control apparatus. Similarly, when in the assembled configuration, the annuli 82 and 182 of the respective first and second housings are disposed a predetermined distance 202 from each other as indicated in FIG. 4.

When in the assembled configuration, as shown in FIG. 4, a sealing sleeve 210 is captured in the fluid chamber 201. The sealing sleeve has an outer cylindrical surface 211, an inner cylindrical surface 212 and opposite end surfaces 213. The sealing sleeve is preferably constructed of a deformable material such as low density polyethylene. The sealing sleeve has an outside diameter which is substantially the same as the interior diameters of the inner cylindrical surfaces 44 and 144 of the first and second housings 20 and 21, respectively. The sealing sleeve is installed by forcing it into the position shown in FIG. 4. The outer cylindrical portions 42 and 142 and the sloped shoulder portions 43 and 143 act as guide surfaces in achieving movement of the sealing sleeve to the position shown in FIG. 4 during assembly. The sealing sleeve is thus held in a compression fit in the assembled flow control apparatus 10.

A valve member, or resilient body 220 is captured in the fluid chamber 201 in the assembled configuration in the area proscribed by the inner cylindrical surface 212 of the sealing sleeve 210 within the area defined by the predetermined distance 202, as shown in FIG. 4. The resilient body is cylindrical, except when deformed as will hereinafter be described, and has an upper surface 221, an opposite lower surface 222 and a peripheral surface 223. As shown in FIG. 4, the diameter of the resilient body is preferably slightly smaller than the diameter of the inner cylindrical surface of the sealing sleeve. The resilient body is preferably constructed of a soft, resilient material, such as rubber or a suitable synthetic substitute.

OPERATION

The operation of the described embodiment of the present invention is believed to be readily apparent and is briefly summarized at this point. As previously discussed, the flow control apparatus 10 of the present invention can be constructed in a wide variety of specific embodiments. In the embodiment shown herein, it will be recalled that the annulus 82 of the first housing has a slotted flow control passage 84 therein while the annulus 182 of the second housing has no such control passage. Depending upon the design requirements for the specific embodiment involved, both such annuli can have flow control passages, or only one. Also, depending upon the design requirements, the sizes of the respective flow control passages can be of predetermined different sizes so as to control the volume of fluid flow from the flow control apparatus, as will be described hereafter.

FIGS. 1, 2, 3, 4 and 6 show the flow control apparatus 10 in the assembled operational configuration. In order to assemble the flow control apparatus to achieve this assembled configuration, the parts, or components, constituting the flow control apparatus are put together in the fashion now to be described. It will be seen first that the flow control apparatus consists of only four components; that is, the first housing 20, the second housing 21, the sealing sleeve 210 and the resilient body 220. This is of significance in that such assembly is readily performed and there is little opportunity for a loss of any of the components because of the few numbers thereof.

Assembly of the flow control apparatus is achieved from the foregoing parts by inserting the sealing sleeve 210 in the fluid chamber 201, as shown in FIG. 4. More specifically, the person assembling the flow control apparatus can grasp, for example, the outer connection portion 76 of the first housing 20 and force the sealing sleeve into the area bounded by the interior surface 41 of the main body wall 40 as previously described. Holding the first housing upright as shown in FIG. 4, the person assembling the flow control apparatus then positions the resilient body 220 in rested relation on the surface 83 of the annulus 82 in covering relation to the slotted flow control passage 84.

The person then grasps, for example, the outer connection portion 176 of the second housing 21 and inserts the arcuate projections 151 thereof in the arcuate receptacles 61 of the first housing. Simultaneously, the arcuate projections 51 of the first housing are inserted in the arcuate receptacles 161 of the second housing. More specifically, the projections in each case are positioned in the entry portions 65 and 165, respectively, of the first and second housings and the mating surface 36 of the first housing placed in facing engagement with the mating surface 136 of the second housing.

Grasping the twist lock tabs 90 and 190 of the respective first and second housings 20 and 21, a twisting force is applied in opposite directions to cause the respective projections to travel within their respective receptacles 61 and 161 until the arcuate lateral flanges 52 of the projections are received beneath the respective interlocking flanges 67 and 167 of the first and second housings thereby releasably locking the first and second housings in engagement with each other. During such movement, the protrusions 72 and 172 travel in the channels 170 and 70 until the protrusions pass from the ends of their respective channels and snap fit into the concave recesses 171 and 71 of the respective opposite housings releasably to retain the housings in this configuration. This, then, is the assembled operational configuration of the flow control apparatus. The assembled configuration is, perhaps, best shown in FIG. 4.

The flow control apparatus, in the assembled operational configuration, is ready for use. It may be installed by individually sliding conduits, not shown, over the distal end portions 79 and 179, the bevelled shoulders 78 and 178 of the outer connection portions 76 and 176 of the respective first and second housings. The bevelled shoulders operate to achieve sealing engagement with the conduits in each instance and establish a path of fluid flow from one of the conduits, through the fluid passages 81 and 181 of the respective housings and into the other of the conduits. When water is passed through the conduits and the flow control apparatus 10, the resilient body 220 is interposed within the path of fluid flow. Thus, fluid is passed into the fluid chamber 201 pressurizing the fluid chamber and the area within the sealing sleeve 210.

Once the fluid chamber 201 is pressurized and sealed in the manner described, fluid pressure causes fluid to pass along the slotted flow control passage 84 in the surface 83 of the annulus 82 and into the fluid passage 81 of the first housing 20. As fluid pressure increases, the lower surface 222 of the resilient body 220 is pressed downwardly and partially inwardly of the slotted flow control passage 84. This controls the cross-sectional area of the slotted flow control passage and thereby the volume of water that can pass therethrough during any interval of time. As the fluid pressure relatively decreases, the extent of this impingement into the slotted flow control passage is relatively reduced, thereby compensating for the reduction in fluid pressure and maintaining a substantially constant volume of water passing along the flow control passage and from the flow control apparatus in any given time period. This achieves the flow control in the operation of the flow control apparatus of the present invention in that, as fluid pressure increases, the area of the flow control passage is reduced and, conversely, as fluid pressure is reduced relatively, the area of the flow control passage is relatively increased. Thus, relatively speaking, the flow control apparatus maintains a substantially constant volume of fluid flow therethrough during fluctuation in fluid pressure.

The flow control apparatus 10 operates as a back flow preventer in that, should pressure on the downstream side within the fluid passage 81 become greater than the fluid pressure on the opposite side of the resilient body 220, the resilient body will immediately move into facing engagement with the surface 183 of the annulus 182. This will immediately terminate fluid flow in the reverse direction since there is no slotted flow control passage 84 in the surface 183 of the annulus 182.

In other embodiments in which the flow control apparatus can be constructed, a slotted flow control passage can be provided in the surfaces of the annuli on each side of the resilient body. In such an embodiment of the flow control apparatus, the fluid can move in either direction through the flow control apparatus and be subject to pressure regulation as previously described. Similarly, the transverse areas of the respective slotted flow control passages can be different so that the volume of fluid flow in different directions can be different.

In the preferred embodiment, the first and second housings are of different coloration. The coloration is coded to designate the flow control capability of each housing. Thus, in the illustrative example, the first housing can be light blue to indicate that it has the slotted flow control passage 84 of a given cross-sectional area or other operational characteristic. Conversely, the second housing 21 can be light green to indicate that it has no slotted flow control passage and thereby to indicate that it can operate as a back flow preventer, as previously described. Accordingly, in the preferred embodiment, a plurality of different housings are employed, each having a different flow control capability and each having a corresponding color code to indicate that flow control ability. Thus, in addition to the first and second housings coded by light blue and green coloration to indicate their characteristics, other housings can be available color coded to indicate relatively larger or smaller cross-sectional areas for the slotted flow control passages thereof. Accordingly, in addition to the light blue and light green housings, there can be, for example, black housings to indicate a slotted flow control passage of smaller cross-sectional area than the flow control passage 84, brown housings to indicate the presence of a slotted flow control passage having a cross-sectional area larger than the flow control passage 84 of the first housing as well as any number of other variables thereof. In view of the hermaphroditic interlocking assemblies 50 and 150, the purchaser of the flow control apparatus, both at the time of purchase, as well as during usage during a long operational life, can readily select the particular combination of flow control characteristics desired by selecting housings meeting the operational objectives desired as designated by the color coding of those housings.

Similarly, the flow control apparatus 10 can readily be assembled and disassembled without the use of tools through the use of the twist lock tabs 90 and 190, the ridges 34 and 134 and the flat side surfaces 32 and 132. However, if desired, a wrench can be employed applied to the side surfaces 32 and 132 to assist in assembling or disassembling the flow control apparatus. In any case, the flow control apparatus can rapidly be disassembled for cleaning and the removal of deleterious material therefrom and rapidly reassembled.

Therefore, the flow control apparatus of the present invention is a significant advance over the prior art which has the ability to control the flow of fluid in either, or both, directions therethrough; which can, in one embodiment, operate as a backflow preventer; which can be assembled and disassembled without the use of tools; which forms a fluid tight seal preventing leakage therefrom; which possesses a hermaphroditic interlocking capability permitting an interchangeability of components; which can be employed with virtually no instruction to permit the user to select the flow control capabilities desired for a specific operational objective; and which can be manufactured and sold at a cost well below that possible for conventional flow control devices.

Although the invention has been herein shown and described in what is conceived to be the most practical and preferred embodiments, it is recognized that departures may be made therefrom within the scope of the invention which is not to be limited to the illustrative details disclosed.

Having described my invention, what I claim as new and desire to secure by Letters Patent is:

1. A flow control apparatus comprising a pair of housings, each having a path for fluid passage therethrough; means for controlling fluid passage; and an assembly including substantially identical portions borne by the housings releasably engageable to interlock the housings in substantially fluid tight relation with said controlling means therewithin between said paths and including at least one projection and at least one receptacle borne by each housing and being individually engageable respectively with one receptacle and one projection of the other housing to interlock the housings.

2. The flow control apparatus of claim 1 wherein each of said projections has a flange and each of said receptacles is bounded by a flange, engageable by the flange of the projection of the order housing, to interlock the housings.

3. A flow control apparatus comprising a pair of housings, each having a path for fluid passage therethrough; means for controlling fluid passage; and an assembly operable to interlock the housings of said pair with said controlling means therewithin between said paths, including a pair of projections and a pair of receptacles borne by each of said housings and the projections and receptacles of the housings are hermaphroditically sized and positioned relative to each other whereby said housings can be disposed in an assembled configuration wherein a projection is received in each receptacle to interlock the housings in said assembled configuration.

4. The flow control apparatus of claim 3 wherein said housings are constructed in a plurality of embodiments having paths for fluid passage of different flow rates and wherein said plurality of embodiments have projections and receptacles of the same hermaphroditically sized and positioned type whereby any two housings of said plurality of housings can be positioned in said assembled configuration to produce a flow control apparatus of a selected flow rate.

5. The flow control apparatus of claim 4 wherein said paths of the housings are individually bounded by annuli; in said assembled configuration said annuli of the housings are spaced from each other a predetermined distance; and said controlling means includes a resilient body captured between said annuli and of a thickness less than said predetermined distance whereby, in said assembled configuration, the flow control apparatus can operate to control the flow of fluid in either direction therethrough and the flow rates in each direction can be determined by selecting a housing of a selected flow rate.

6. The flow control apparatus of claim 5 including designating the individual flow rate of a housing of said plurality of embodiments by individual colors.

7. A flow control apparatus comprising a pair of housings, each having a path for fluid passage therethrough; means for controlling fluid passage; and an assembly operable to interlock the housings of said pair in an assembled configuration with said controlling means therewithin between said paths of the housings, said paths being individually bounded by annuli which, in said assembled configuration, are spaced from each other a predetermined distance, said controlling means including a resilient body captured between said annuli in said assembled configuration and the resilient body having a thickness less than said predetermined distance whereby, in said assembled configuration, the flow control apparatus can operate to control the flow of fluid in either direction therethrough, and said controlling means further including a passage formed in each of said annuli extending transversely thereof and, during operation in said assembled configuration, fluid is passed through the path of one of said housings to position the resilient body in engagement with the annulus of the other of said housings whereby fluid flow is controlled by the movement of the fluid along the passage in the annulus of said other of said housings and from the flow control apparatus along the path thereof.

8. A flow control apparatus comprising a pair of housings, each having a path for fluid passage therethrough; means for controlling fluid passage; and an assembly operable to interlock the housings of said pair in an assembled configuration with said controlling means therewithin between said paths of the housings, said paths being individually bounded by annuli which, in said assembled configuration, are spaced from each other a predetermined distance, said controlling means including a resilient body captured between said annuli in said assembled configuration and the resilient body having a thickness less than said predetermined distance, said controlling means further including a passage formed in the annulus of one of the housings extending transversely thereof, but not in the annulus of the other of said housings and, during operation in said assembled configuration during fluid flow in a normal direction through the housings, fluid is passed through the path of the housing not having said passage in the annulus thereof to position the resilient body in engagement with the annulus of the other of said housings having said passage whereby fluid flow is controlled in said normal direction of fluid flow therethrough by the movement of fluid along said passage in the annulus of said other of said housings and from the flow control apparatus along the path thereof, the flow control apparatus substantially prevents fluid flow in a reverse direction of fluid flow therethrough by engagement of said resilient body with the annulus not having said passage upon a reversal of the direction of fluid flow therethrough, and the flow control apparatus can be employed substantially to stop fluid movement along a fluid course passing through the flow control apparatus in said normal direction by positioning the flow control apparatus in the reverse direction in said fluid course.

* * * * *

UNITED STATES PATENT AND TRADEMARK OFFICE
CERTIFICATE OF CORRECTION

PATENT NO. : 5,295,506
DATED : March 22, 1994
INVENTOR(S) : Allan L. Smith

It is certified that error appears in the above-identified patent and that said Letters Patent is hereby corrected as shown below:

Column 10, Line 39, delete "order" and substitute

---other---.

Signed and Sealed this

Twenty-sixth Day of July, 1994

Attest:

BRUCE LEHMAN

Attesting Officer

Commissioner of Patents and Trademarks